United States Patent
Ishida (10) Patent No.: US 6,714,773 B1
(45) Date of Patent: Mar. 30, 2004

(54) ANTENNA SWITCHING IN MULTIPLE RADIO TERMINAL

(75) Inventor: Takayasu Ishida, Shizuoka (JP)

(73) Assignee: NEC Corporation (JP)

( * ) Notice: Subject to any disclaimer, the term of this patent is extended or adjusted under 35 U.S.C. 154(b) by 637 days.

(21) Appl. No.: 09/620,148

(22) Filed: Jul. 20, 2000

(30) Foreign Application Priority Data

Jul. 23, 1999 (JP) .......................................... 11-209810

(51) Int. Cl.7 .............................. H04B 1/06; H04B 1/38
(52) U.S. Cl. ................. 455/272; 455/552.1; 455/553.1; 455/78; 455/80; 455/277.1
(58) Field of Search .......................... 455/552.1, 553.1, 455/73, 78, 79, 80, 107, 272, 277.1, 277.2, 282

(56) References Cited

U.S. PATENT DOCUMENTS

| | | | | |
|---|---|---|---|---|
| 5,625,881 A | * | 4/1997 | Sandler et al. ............. | 455/38.3 |
| 5,715,525 A | * | 2/1998 | Tarusawa et al. ........... | 455/101 |

FOREIGN PATENT DOCUMENTS

| | | |
|---|---|---|
| JP | 5167566 | 7/1993 |
| JP | 5183475 | 7/1993 |
| JP | 5316018 | 11/1993 |
| JP | 7-7462 | 1/1995 |
| JP | 8116301 | 5/1996 |
| JP | 927782 | 1/1997 |
| JP | 0823751 | 2/1998 |

OTHER PUBLICATIONS

U.K. Search Report (in English) issued Feb. 5, 2001 in a related application.

* cited by examiner

Primary Examiner—Vivian Chin
Assistant Examiner—Eugene Yun
(74) Attorney, Agent, or Firm—Dickstein, Shapiro, Morin & Oshinsky, LLP.

(57) ABSTRACT

In a multiple portable phone, a first antenna is provided for a first communication system, a second antenna is provided in common to the first communication system and a second communication system. A switching circuit is controlled based on a control signal. A receiving circuit for the first communication system is connected to one of the first and second antennas via the switching circuit. A transmitting and receiving circuit provided for the second communication system is connected to the second antenna. A control unit generates the control signal to control the switching circuit to connect the impedance matching circuit to a path from the second antenna to the transmitting and receiving circuit when the transmitting and receiving circuit carries out a receiving operation using the second antenna while the receiving circuit carries out a receiving operation using the first antenna.

18 Claims, 4 Drawing Sheets

| | CONTROL LINE | | | STATE | SW STATES OF ANT SW IC 103 | | | | | | | |
|---|---|---|---|---|---|---|---|---|---|---|---|---|
| | CTL① | CTL② | CTL③ | | SW1 | SW2 | SW3 | SW4 | SW5 | SW6 | SW7 | SW8 |
| 301 | L | H | H | COMMON ANTENNA RECEPTION | OFF | OFF | ON | ON | OFF | OFF | OFF | OFF |
| 302 | L | L | H | BUILT-IN ANTENNA RECEPTION | ON | OFF | ON | OFF | OFF | OFF | OFF | ON |
| 303 | H | H | H | COMMON ANTENNA TRANSMISSION | OFF | OFF | OFF | OFF | OFF | ON | OFF | OFF |
| 304 | L | H | L | EXTERNAL TERMINAL 109 RECEPTION | OFF | ON | OFF | OFF | ON | OFF | OFF | OFF |
| 305 | L | L | L | EXTERNAL TERMINAL 106 RECEPTION | OFF | OFF | OFF | OFF | OFF | OFF | OFF | ON |
| 306 | H | H | L | EXTERNAL TERMINAL 109 TRANSMISSION | OFF | OFF | OFF | OFF | OFF | OFF | ON | OFF | ized
ANTENNA SWITCHING IN MULTIPLE RADIO TERMINAL

BACKGROUND OF THE INVENTION

1. Field of the Invention

The present invention relates to a simple portable phone built-in portable phone. More particularly, the present invention relates to a simple portable phone built-in portable phone in which degradation of a transmission and reception characteristic can be prevented in antenna switching.

2. Description of the Related Art

A "multiple radio terminal" is known in which a simple portable phone (PHS) is built-in a portable phone (PDC). The multiple radio terminal has a diversity antenna structure which uses a PDC and PHS transmitting and receiving common antenna (hereinafter, to be also referred to as a "PDC/PHS common antenna") and a PDC receive-only built-in antenna. An antenna switching integrated circuit is arranged between a PDC transmitting and receiving section and a PHS transmitting and receiving section.

Figure 1:
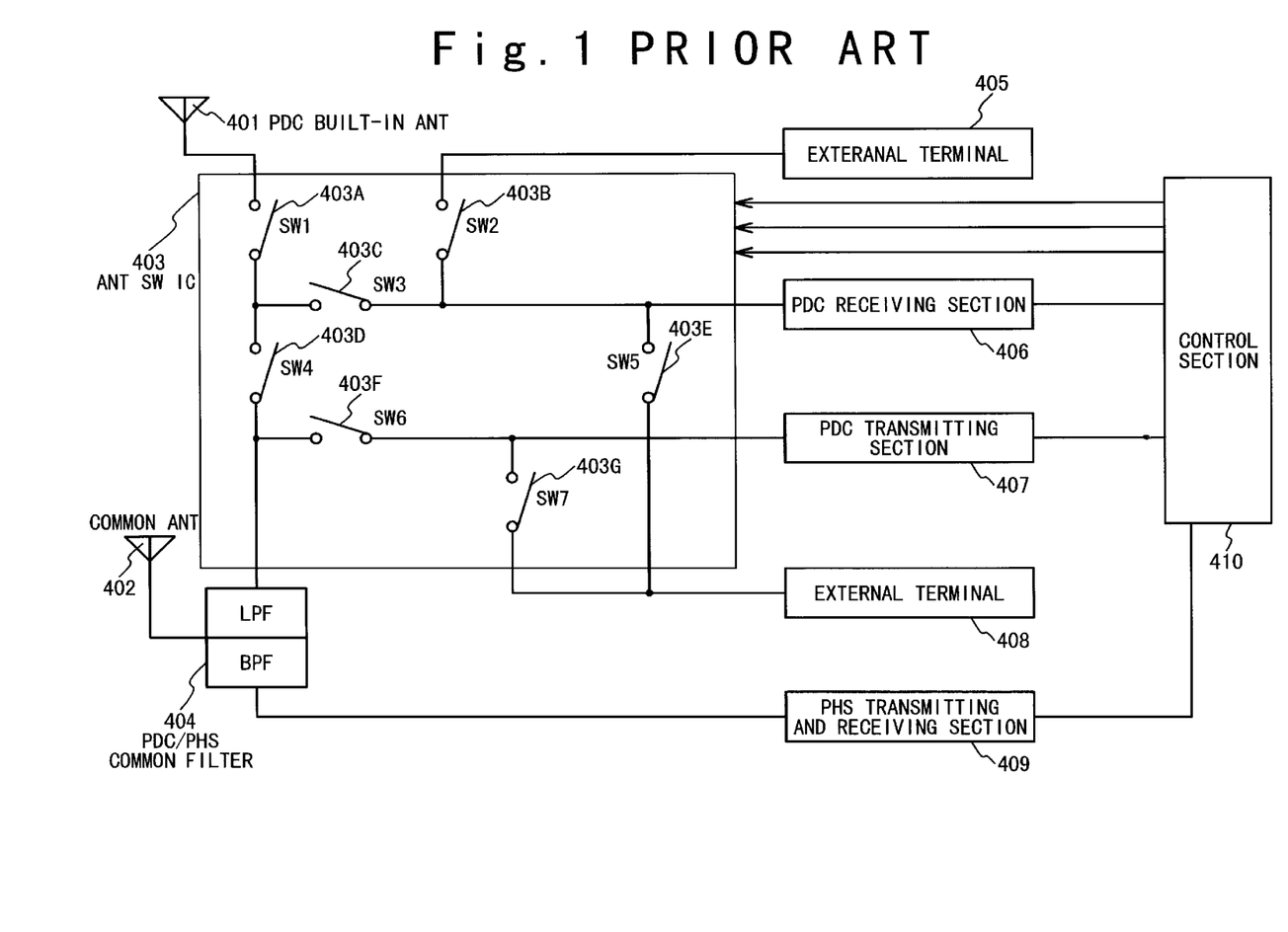
FIG. 1 is a diagram showing the structure of a conventional multiple portable phone.

FIG. 1 is a diagram showing a structure example of the PDC/PHS multiple radio terminal of this type. The PDC/PHS multiple radio terminal is composed of a PDC/PHS common antenna 402 and a PDC built-in antenna 401 as the antenna structure. Also, the PDC/PHS multiple radio terminal is composed of an external terminal 408 and an external terminal 405 as the external input-output terminals. Moreover, the PDC/PHS multiple radio terminal is composed of a PDC receiving section 406, a PDC transmitting section 407 and a PHS transmitting and receiving section 409 as the transmission and reception structure.

The PDC/PHS common antenna 402 is connected with the PHS transmitting and receiving section 409 through a PDC/PHS common filter 404. Also, the PDC/PHS common antenna 402 is connected with the PDC receiving section 406 and the PDC 15 transmitting section 407 through the PDC/PHS common filter 404 and an antenna switching circuit (ANT SW IC) 403. Also, the external terminals 408 and 405 are connected with the PDC receiving section 406 and the PDC transmitting section 407 through the antenna switching circuit 403. The PHS transmitting and receiving section 409, the PDC receiving section 406 and the PDC transmitting section 407 are connected with a control unit 410. Also, the antenna switching circuit 403 is composed of a plurality of switches SW1 403A to SW7 403G. Each the switches 403A to 403 G is set to the ON/OFF state in response to a control signal from the control unit 410. Thus, the switching control between the antenna and the transmitting and receiving section is carried out.

In such a PDC/PHS multiple radio terminal, an intermittent receiving operation is carried out in the reception wait condition, to eliminate a problem in each signaling system, especially, in case of use on high-speed movement in an area, and in case of use in a underground town area. Also, in such a multiple radio terminal, in the reception wait condition, each operation is not controlled finely, and the PDC side and the PHS side are controlled independently to operate asynchronously. This is because simplification of the circuit structure design and power consumption.

In the PDC/PHS multiple radio terminal as mentioned above, there is a case where the PHS side receives using the PDC/PHS common antenna during the reception in which the PDC side uses a built-in antenna. In this case, the conventional antenna switching circuit disconnects the PDC/PHS common antenna from the PDC receiving section. Therefore, the input/output impedance on PDC side of the PDC/PHS common filter becomes unstable. As a result, the matching condition shifts so that the characteristic of the PDC/PHS common filter becomes worse, resulting in degradation of the transmission and reception characteristic on the PHS side. Therefore, especially, the following problem occurs.

The reception on the PHS side can not be carried out normally at an intermittent reception timing of the PHS side, in the state that the PDC side receives by use of the built-in antenna. As a result, there is a possibility that the synchronization of the reception timing on the PHS side goes out. Also, when the synchronization of the reception timing on the PHS side goes out, the operation to establish the synchronization of the reception timing once again becomes necessary on the PHS side to switch from the intermittent receiving operation to the continuation receiving operation for receiving the terminating call. As a result, the problem is caused that the power consumption increases further with the continuation receiving operation for such synchronous establishment.

In conjunction with the above description, a portable terminal is disclosed in Japanese Laid Open Patent Application (JP-A-Heisei 5-167566). In this reference, the portable terminal is composed of an antenna (1), a receiving section (2), a data clock generating section (3), a first detection notifying section (4), a majority determining section (5), a second detection notifying section (6), and a central processing unit (7). The central processing unit (7) controls the receiving section (2) to stop based on a notice from the first detection notifying section (4) and the receiving section by a notice from the second detection notifying section (6). In this way, when a majority is determined before all data are received, a receiving circuit is stopped without reception of a remainder serial data. When the head of the following data format is detected, the receiving circuit is controlled to start an operation. Thus, low power consumption is realized.

Also, a diversity control method is disclosed in Japanese Laid Open Patent Application (JP-A-Heisei 5-183475). In this reference, in each of n-system base station receiving sections (31, 3N), after a desired signal is extracted from an SD reception signal, the received electric field intensity levels of the desired signals are detected and compared with each other (317). A diversity switching control signal is generated based on the comparing result. A receiving switch section (318) is driven in response to the diversity switching control signal to take out a demodulation signal of the desired signal of a system which has a higher received electric field intensity level. A base station includes n-system base station transmitting section (21, 2N) in addition to the n-system base station receiving sections (31, 3N). A transmission SD antenna is provided for the base station. A base station transmitting section transmits a transmission signal to a mobile station using the transmission SD antenna switched based on the diversity switching control signal from the base station receiving section.

Also, a mobile radio apparatus is disclosed in Japanese Laid Open Patent Application (JP-A-Heisei 5-316018). In this reference, a control data is transmitted from a base station. The control data is received by a receiving circuit (2) via an antenna (1) in a reception waiting state, is demodulated by a digital data demodulating circuit (4), is subjected to a majority determining process by a majority determining circuit (5), and is analyzed by a microprocessor (6). Also, the control data is converted into a digital data by an A/D converter (3). The microprocessor (6) determines the reception electric field intensity of the digital data and determines the number of words to be received within the control data to be repeatedly transmitted. The microprocessor (6) receives only the words of a predetermined number and controls the power source to the receiving circuit to be cut for a time from the head of the remaining words to the next sync signal.

Also, a personal handy phone is disclosed in Japanese Laid Open Patent Application (JP-A-Heisei 8-116301). In this reference, the power supply to a transmitting circuit (3) is turned off and an antenna switch (2) is set to the receiving circuit (5), in a reception waiting mode. A timer circuit (7) is connected to a call identifying circuit (6) and the receiving circuit (5) by a control line (18) to control the power to be intermittently supplied to them. When the mobile phone is called from a base station during the intermittent operation, the identifying circuit (6) stops the timer operation and controls a ringing speaker (12). When a user carries out an off-hook operation, an LAP controller (9) is initiated to establish a link and a TDMA/TDD controller (4) starts the operation. Thus, the handy phone enters a communication mode.

Also, a radio apparatus is disclosed in Japanese Laid Open Patent Application (JP-A-Heisei 9-27782). In this reference, a radio section (12) includes a receiving section for demodulating a receive data from a radio wave received by an antenna (11). A power supply control unit (14) controls the supply of power source (13) to the radio section (12) in an ON/OFF mode. A first timer (15) is set with a period of the ON/OFF control by the power supply control unit (14). A second timer (16) is set with a time longer than the ON time of the first timer (15). A control unit (20) controls the respective sections, and switches from the first timer (15) to the second timer (17) to allow the receiving section to receive data for longer time.

SUMMARY OF THE INVENTION

An object of the present invention is to provide a multiple portable phone in which the degradation of transmission and reception characteristic on a PHS side through an antenna switching operation on a PDC side can be prevented.

Another object of the present invention is to provide a multiple portable phone of a PDC side diversity system in which the suppression of power consumption and the prevention of going-out of synchronization in an intermittent receiving operation are made possible.

In order to achieve an aspect of the present invention, a multiple portable phone includes a first antenna for a first communication system, a second antenna common to the first communication system and a second communication system, and a switching circuit controlled based on a control signal. The multiple portable phone further includes a receiving circuit provided for the first communication system, and connectable to the first and second antennas via the switching circuit, and a transmitting and receiving circuit provided for the second communication system, and connectable to the second antenna, and an impedance matching circuit connected to the switching circuit. A control unit generates the control signal to control the switching circuit to connect the impedance matching circuit to a path from the second antenna to the transmitting and receiving circuit when the transmitting and receiving circuit carries out a receiving operation using the second antenna while the receiving circuit carries out a receiving operation using the first antenna.

The multiple portable phone may further include a common filter of a low pass filter and a band pass filter. In this case, the receiving circuit may be connected to the second antenna via the switching circuit and the low pass filter in response to the control signal, and the transmitting and receiving circuit may be connected to the second antenna via the band pass filter.

Also, the control unit controls the receiving circuit while generating the control signal, such that the receiving circuit carries out an intermittent receiving operation in a first predetermined time interval as the receiving operation while one of the first and second antennas is selected. In this case, the control unit may control the transmitting and receiving circuit while generating the control signal, such that the transmitting and receiving circuit carries out an intermittent receiving operation in a second predetermined time interval as the receiving operation using the second antenna. Also, the control unit may control the intermittent receiving operation of the receiving circuit and the intermittent receiving operation of the transmitting and receiving circuit to be independent and asynchronous.

Also, the multiple portable phone may further include a transmitting circuit provided for the first communication system and connectable to the first and second antennas via the switching circuit. In this case, the switching circuit may include first and second switches operatively connectable the receiving circuit to the first antenna. In addition, the switching may further include third and fourth switches operatively connectable the transmitting circuit to the first antenna via the first switch, wherein a node between the third and fourth switches is operatively connected to the second antenna, and a fifth switch operatively connectable the impedance matching circuit to the second antenna via the first switch. The first to fifth switches are controlled in response to the control signal. Moreover, the switching circuit may further include a sixth switch connected between a first external terminal and a node between the second switch and the receiving circuit. In this case, the sixth switch is controlled in response to the control signal. Also, the switching circuit may further include a seventh switch connected between a second external terminal and the node between the second switch and the receiving circuit, and an eighth switch connected between the second external terminal and a node between the fourth switch and the transmitting circuit. In this case, the sixth to eighth switches are controlled in response to the control signal.

The impedance matching circuit may have substantially the same impedance as the receiving circuit. Also, the first communication system may be a PDC system and the second communication system may be a PHS system. In addition, the first antenna may be built in the phone.

In another aspect of the present invention, an antenna switching method in a multiple portable phone is attained by (a) selectively connecting a receiving circuit for a first communication system to one of a first antenna and a second antenna via a switching circuit for a receiving operation of the receiving circuit; by (b) connecting a transmitting and receiving circuit for a second communication system to the second antenna for a receiving operation of the transmitting and receiving circuit; and by (c) compensating impedance change depending on the switching circuit.

The (a) step may be attained by connecting the receiving circuit to the second antenna via the switching circuit and a low pass filter, and the (b) step may be attained by connecting the transmitting and receiving circuit to the second antenna via a band pass filter.

The (c) step may be attained by selectively connecting an impedance matching circuit to a path from the second antenna to the transmitting and receiving circuit for the receiving operation of the transmitting and receiving circuit. In this case, the (c) step includes: connecting the impedance matching circuit to the path from the second antenna to the transmitting and receiving circuit when the transmitting and receiving circuit carries out the receiving operation using the second antenna while the receiving circuit carries out the receiving operation using the first antenna.

Also, the receiving operation of the receiving circuit is an intermittent receiving operation in a first predetermined time interval while one of the first and second antennas is selected. The receiving operation of the transmitting and receiving circuit is an intermittent receiving operation in a second predetermined time interval using the second antenna. The intermittent receiving operation of the receiving circuit and the intermittent receiving operation of the transmitting and receiving circuit may be independent from each other and asynchronous with each other.

Also, it is desirable that the impedance matching circuit has substantially the same impedance as the receiving circuit. Also, the first communication system is a PDC system and the second communication system is a PHS system.

DESCRIPTION OF THE PREFERRED EMBODIMENTS

Hereinafter, a multiple portable phone according to the embodiment of the present invention will be described below in detail with reference to the attached drawings. In the multiple portable phone, a simple portable phone system such as a PHS system is built in a portable phone such as a PDC system.

Figure 2:
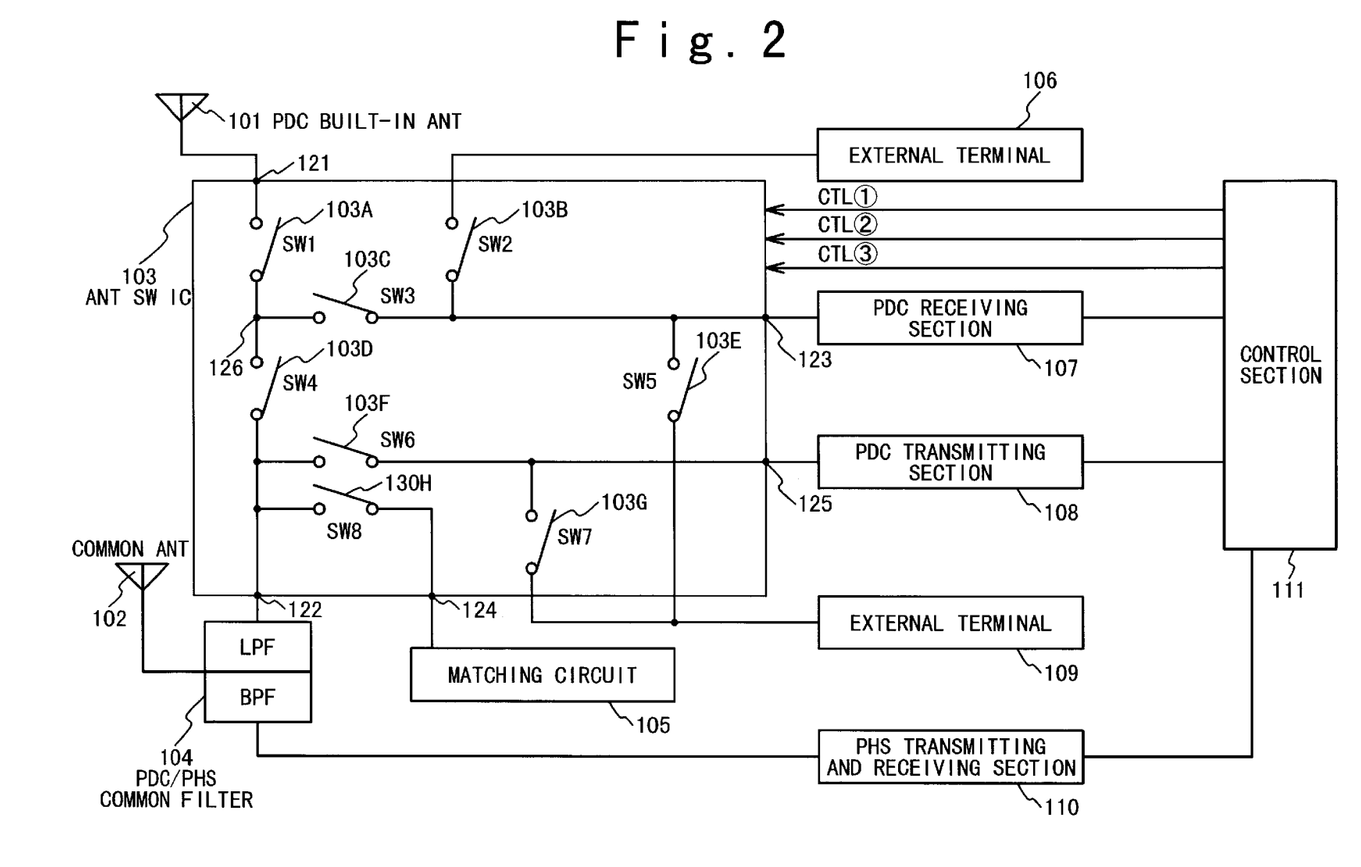
FIG. 2 is a diagram showing the structure of a multiple portable phone according to an embodiment of the present invention.

FIG. 2 is a block diagram showing the structure of a radio section of the PHS built-in type PDC according to the embodiment of the present invention. An antenna structure is composed of a PDC/PHS common antenna 102 and a built-in antenna 101. A transmitting and receiving structure is composed of a PDC receiving section 107, a PDC transmitting section 108 and a PHS transmitting and receiving section 110. As the external terminals, an external terminal 109 and an external terminal 106 are provided. The PDC/PHS common antenna 102 is connected to a node 122 of an antenna switching circuit 103 via a low pass filter (LPF) of a PDC/PHS common filter 104. Also, the PDC/PHS common antenna 102 is connected to the PHS transmitting and receiving section 110 via a band pass filter (LPF) of the PDC/PHS common filter 104. The built-in antenna 101 is connected with a node 121 of the antenna switching circuit 103. The PDC receiving section 107 and the PDC receiving section 108 are connected with the antenna switching circuit 103 via nodes 123 and 125, respectively. A matching circuit 105 is connected to the antenna switching circuit 103 via a node 124. A control section 111 is connected with the PDC receiving section 107, the PDC transmitting section 108, the PHS transmitting and receiving section 110 and the antenna switching circuit 103. Thus, the connection between the PDC built-in antenna 101, the PDC/PHS common filter 104, and the external terminals 106 and 109 and each transmitting and receiving sections is controlled by the antenna switching circuit 103 based on control signals from the control section 111.

The antenna switching circuit 103 is provided with switches SW1 to SW8. The switch SW1 is provided between the node 121 and a node 126, and the switch SW2 is provided between the external terminal 106 and the node 123. The switch SW3 is provided between the node 126 and the node 123, and the switch SW4 is provided between the node 126 and the node 122. The switch SW5 is provided between the node 123 and the external terminal 109, and the switch SW6 is provided between the node 122 and the node 125. The switch SW7 is provided between the node 125 and the external terminal 109, and the switch SW8 is provided between the node 122 and the node 124. Thus, the switches SW1 and SW3 connect the built-in antenna 101 and the PDC receiving section 107. The switches SW3 and SW4 connect the PDC/PHS common antenna 102 and the PDC receiving section 107. The switch SW6 connects the PDC/PHS common antenna 102 and the PDC transmitting section 108. The switch SW8 connects the PDC/PHS common antenna 102 and the matching circuit 105. The switches SW5 and SW7 connect the external terminal 109 with the PDC receiving section 107 or the PDC transmitting section 108. The switch SW2 connects the external terminal 106 and the PDC receiving section 107. Each of the switches SW1 to SW8 of the antenna switching circuit 103 is switched based on the control signals CTL ①, CTL ② and CTL ③ from the control unit 111.

In this embodiment, the PDC/PHS common filter 104 is provided to carry out frequency division or frequency synthesization of the signal of a PDC frequency band and the signal of a PHS frequency band from the PDC/PHS common antenna 102. The output section of the PDC/PHS common filter on the PDC side is composed of LPF (Low Pass Filter) and the output section thereof on the PHS side is composed of BPF (Band Pass Filter). Also, the PDC side terminal of LPF is connected with the antenna switching circuit 103 via the node 122 and the PHS side terminal of BPF is connected with the PHS transmitting and receiving section.

The outline of the function of each section is as follows.

The PHS transmitting and receiving section 110 carries out division and wave synthesization of the PHS data and the PDC data by the PDC/PHS common filter 104, and transmission and reception are carried out by the PDC/PHS common antenna 102. A signal is received by the PHS transmitting and receiving section 110 and demodulated and supplied to the control unit 111. The PDC receiving section 107 is connected with either of the PDC built-in antenna 101 and the PDC/PHS common antenna 102. A signal obtained by receiving and demodulating the PDC data is supplied to the control unit 111. Also, a transmission signal is outputted from the PDC transmitting section 108 and the PHS transmitting and receiving section 110 is transmitted through the PDC/PHS common antenna 102.

The control unit 111 carries out the process for the PHS reception data and the PDC reception data supplied from the PHS transmitting and receiving section 110 and the PDC receiving section 107, a transmission data to the PDC transmitting section, and a process for a sound data. Also, the control unit 111 carries out a synchronization establishing process in an intermittent receiving operation and a process for a control data such as an originating call and a terminating call in the intermittent receiving operation. Especially, the control unit 111 carries out the control of the synchronizing process of the intermittent receiving operation in the PDC receiving section 107 and the PHS transmitting and receiving section 110. Thus, on the basis of the reception data in the intermittent receiving operation, the reception timing is set to a timing at which the terminating call data can be obtained in the intermittent receiving operations of the PDC receiving section and the PHS receiving section. Also, for such control, the control unit 111 outputs binary control signals CTL ① to ③ ("H" and "L") to the antenna switching integrated circuit 103 to switch the states of SW1 to SW8.

Figure 4:
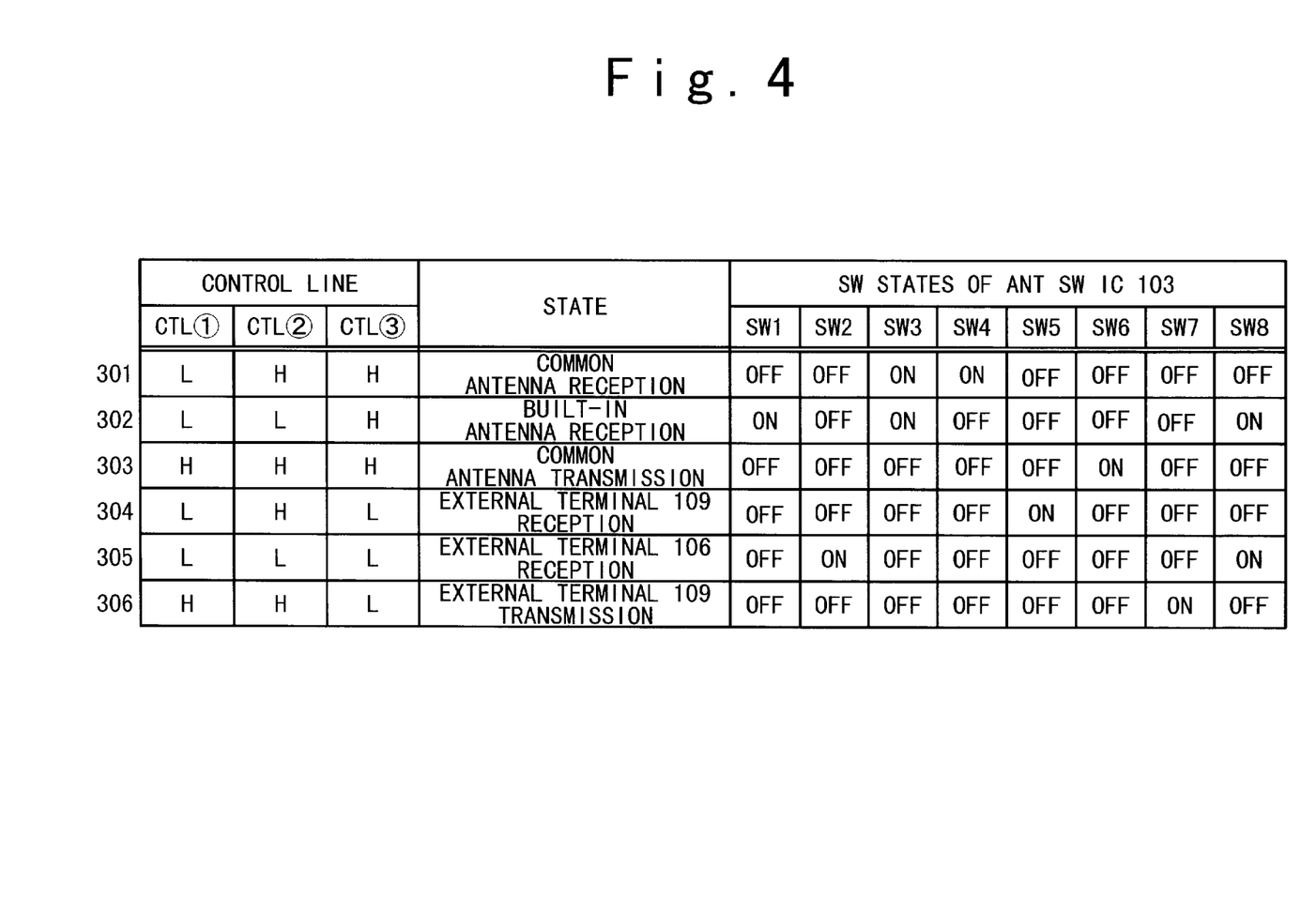
FIG. 4 is a diagram showing a table indicating the switching state of the multiple portable phone according to an embodiment of the present invention.

For example, as shown in FIG. 4, when the PDC receiving section 107 carries out a receiving operation using the PDC/PHS common antenna 102, the switches SW1, SW2, SW5, SW6, SW7 and SW8 are set to the turning off state, and the switches SW3 and SW4 are set to the turning on state. When the PDC receiving section 107 carries out a receiving operation using built-in antenna 101, the switches SW2, SW4, SW5, SW6, and SW7 are set to the turning off state, and the switches SW1, SWSW3 and SW8 are set to the turning on state. When the PDC transmitting section 108 carries out a transmitting operation using the PDC/PHS common antenna 102, the switches SW1, SW2, SW3, SW4, SW5, SW7, and SW8 are set to the turning off state, and the switch SW6 is set to the turning on state. When the PDC receiving section 107 carries out a receiving operation using the external terminal 109, the switches SW1, SW2, SW3, SW4, SW6, SW7, and SW8 are set to the turning off state, and the switch SW5 is set to the turning on state. When the PDC receiving section 107 carries out a receiving operation using the external terminal 106, the switches SW1, SW3, SW4, SW5, SW6, and SW7 are set to the turning off state, and the switches SW2 and SW8 are set to the turning on state. When the PDC transmitting section 108 carries out a transmitting operation using the external terminal 109, the switches SW1, SW2, SW3, SW4, SW5, SW6, and SW8 are set to the turning off state, and the switch SW7 is set to the turning on state.

For example, the switch SW1 103A and the switch SW3 103C are set to the turning on in the antenna switching circuit 103, the built-in antenna 101 is selected. Also, the switch SW3 103C and the switch SW4 103D are set to the turning on state in the antenna switching circuit 103, the PDC/PHS common antenna 102 is selected. When the switch SW1 103A and the switch SW3 103C are turned on to select the built-in antenna 101, the switch SW4 103D is set to the turning off state to disconnect the PDC/PHS common antenna 102. In this case, because the transmitting operation is not carried out, the switch SW6 103F is set to the turning off state.

When the external terminal 109 or 106 is used to be connected with an antenna such as an adapter mounted on a car, either of the switch SW5, the switch SW7 and the switch SW2 is set to the turning on state. The other switches are set to the turning off state in addition to the switch SW1, the switch SW3, the switch SW4, and the switch SW6.

It should be noted that the above-mentioned radio section structure of the PHS transmitting and receiving section and the PDC transmitting and receiving section are well known by a person in the art. Also, the radio section is not directly related to the present invention. Therefore, the detailed description is omitted.

Next, the operation in this embodiment will be described with reference to FIGS. 3A to 3D and FIG. 4.

In the multiple radio terminal of a radio phone (PDC) and a simple radio phone (PHS), an intermittent receiving operation is carried out in both of the PDC side and the PHS side to reduce power consumption.

Figure 3A:
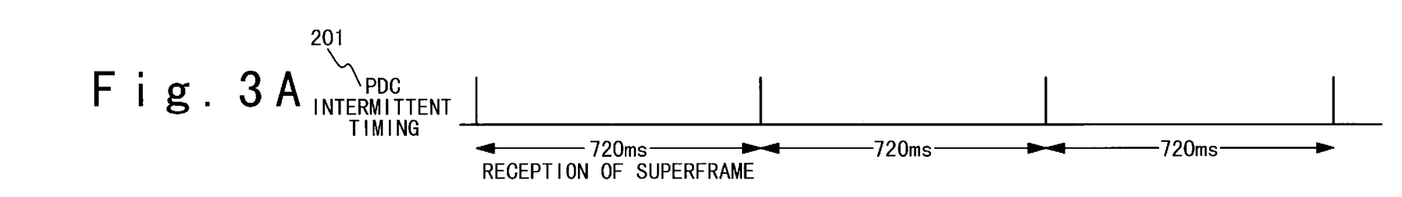
FIGS. 3A to 3D are diagram showing time charts of the intermittent receiving operation according to the embodiment of the present invention.
Figures 3B, 3C, 3D:
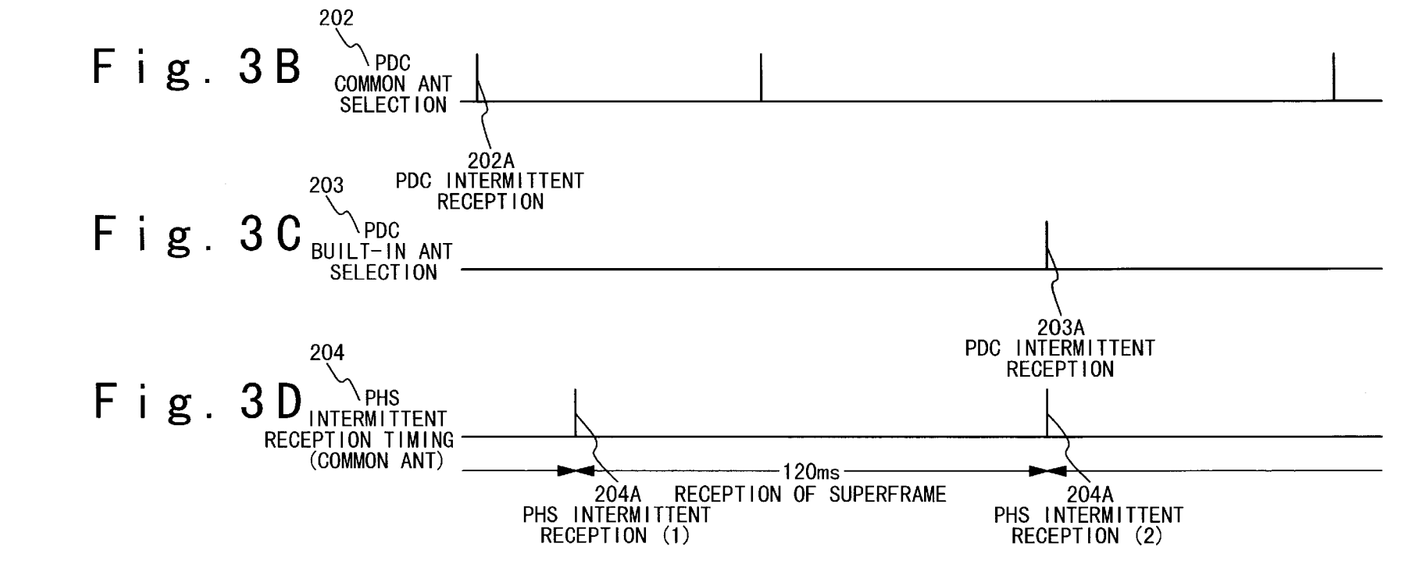

As shown in FIGS. 3A and 3D, the PDC side intermittently carries out a superframe reception in the interval of 720 ms (201), and the PHS side intermittently carries out a superframe reception in the interval of 1.2 s (204). Also, as shown in FIGS. 3B and 3C, the intermittent receiving operation on the PDC side is carried out by switching between the PDC/PHS common antenna 102 and the PDC built-in antenna 101 at the period of 720 ms. As shown in FIG. 3D, the PHS side carries out the intermittent receiving operation at the interval of 1.2 s in asynchronous with the operation of the common antenna on the PDC side.

Also, as shown in FIG. 4, the switch SW3 and the switch SW4 are set to the turning on state based on the control signals CTL ① to ③, when the PDC side carries out the receiving operation using the PDC/PHS common antenna (301). At this time, the PDC receiving section 107 receives the PDC wave from the PDC/PHS common antenna 102 through LPF of the PDC/PHS common filter 104 and switch SW3 and switch SW4. Also, when the PDC side carries out the receiving operation using the built-in antenna (302), the switch SW1, the switch SW3 and the switch SW8 are set to the turning on state. At this time, the PDC receiving section 107 receives the PDC wave from the PDC built-in antenna 101 through the switch SW1 and the switch SW3. It should be noted that when the PDC side carries out the transmitting operation using the PDC/PHS common antenna (303), the switch SW6 is set to the turning on state and all other switches are set to the turning off state.

In the above, a system may be adopted in which the mutual relation of the respective reception timings of the PDC side and the PHS side is asynchronously controlled by the control unit 111. In this case, until there is a terminating call or an originating call to reduce the load of the control, the PDC side carries out the selection (202) of the PDC/PHS common antenna 102 or the selection (203) of the built-in antenna irrespective of the operation on the PHS side.

It is supposed that the PHS side starts the receiving operation using the PDC/PHS common antenna 102 (204A) after the PDC side selects the PDC/PHS common antenna 102 and starts the receiving operation (202A). In this case, the switch SW4 and the switch SW3 are set to the turning on state and the PDC/PHS common filter 104 and the PDC receiving section 107 are connected to each other. This is because the switch SW states (301) of the antenna switching circuit 103 are maintained until the time of the next reception on the PDC side. Also, the matching condition of the PDC/PHS common filter 104 is not changed and the PHS side can be normally received at the timing of 204A.

However, it is supposed that the intermittent receiving operation timing on the PDC side and the intermittent receiving operation timing on the PHS side become same. It is supposed that the PDC side selects a built-in antenna (203A). The switch SW4 and the switch SW6 are set to the turning off state and the switch SW8 is set to the turning on state (302) in the switch SW states of the antenna switching circuit 103. As a result, the PDC/PHS common antenna 102 is disconnected from the PDC receiving section 107. However, since switch SW8 is set to the turning on state, the matching circuit 105 is connected with the output side of LPF of the PDC/PHS common filter 104. Here, the impedance of the matching circuit 105 is set to be equal to the impedance when the PDC transmitting circuit or the PDC receiving circuit is connected.

Therefore, in this case, the matching condition of the PDC/PHS common filter 104 never changes. Also, the PHS side can carry out a normal receiving operation at the timing of 204B. It should be noted that a case where the reception timings on the PDC side and the reception timing on the PHS side are incident with each other by chance, an example of the intermittent receiving operation timing is described. However, when the intermittent receiving operation on the PHS side is carried out after the PDC side selects the built-in antenna, until the antenna is switched to the PDC/PHS common antenna 102 on the PDC side, the similar operation is carried out.

In this way, the reliability of the synchronization holding is increased about the intermittent receiving operation timing of the PHS transmission and reception circuit, and it is possible to prevent the synchronization from going out. As a result, the PHS transmitting and receiving circuit can be switched from the intermittent receiving operation to the continuous receiving operation so that it is possible to avoid continuation of the synchronous establishing operation in the intermittent receiving operation timing.

In the above embodiment, the common filter is adopted for the filter for the PDC wave and the filter for the PHS wave, and the example in which the common filter is connected between the PDC/PHS common antenna and the antenna switching circuit 103 is described. However, the filter on the PHS side may be arranged between the antenna switching circuit 103 and the PHS transmitting and receiving section 110, and the filter on the PDC side may be arranged between the antenna switching circuit 103 and the PDC receiving section 107.

As mentioned above, according to the present invention, when switch SW8 103H is set to the turning on state so as not to change an antenna matching condition on the side of the antenna switching circuit 103, the matching circuit 105 is connected with the antenna side, and the PDC receiving section 107 selects the PDC built-in antenna 101 and carries out the receiving operation, it becomes possible to keep the reception characteristic on the PHS side to be constant, by avoiding an influence on the antenna matching condition on the PHS side, even if the PHS transmitting and receiving section 110 carries out the transmitting operation and receiving operation.

According to the present invention, when the antenna switching switch is switched to use the side of the built-in antenna by the diversity operation on the PDC side, the impedance on the side of the PDC/PHS common antenna is fixed by the matching circuit. Therefore, there is no case that the matching state of the impedance of the PDC/PHS common antenna becomes unstable, and it can prevent the degradation of the transmission and reception characteristic on the PHS side in case of the reception by use of the PDC built-in antenna. Especially, when the PDC/PHS common filter is connected with the PDC/PHS common antenna, the reception degradation on the PHS side due to characteristic degradation of the PDC/PHS common filter can be prevented in case of selection of the built-in antenna by the antenna switching switch.

Also, according to the present invention, when an intermittent receiving operation is carried out in the PDC receiving section and the PHS receiving section, the intermittent receiving operation on the PHS side becomes stable and synchronization holding is warranted. Therefore, the synchronization going-out due to reception failure which is based on characteristic degradation of the PDC/PHS common filter and so on can be prevented. Also, the continuous receiving operation for the sync signal detection becomes unnecessary in case of synchronization going-outs in the intermittent receiving operation and the power consumption can be restrained.

Also, the antenna switching circuit of the present invention has a simple structure in which the single switch is provided for the antenna switching integrated circuit and a connection terminal of the matching circuit which is connected with an external matching circuit, and the fault of the PHS reception can be avoided. The increase of the used parts, the use of the dedicated line and so on are unnecessary, and it becomes possible for a printed wiring board to be made small and to be made in high density.

What is claimed is:

1. A multiple portable phone comprising:
   a first antenna for a first communication system;
   a second antenna common to said first communication system and a second communication system;
   a switching circuit controlled based on a control signal;
   a receiving circuit provided for said first communication system, and connectable to said first and second antennas via said switching circuit;
   a transmitting and receiving circuit provided for said second communication system, and connectable to said second antenna;
   an impedance matching circuit connected to said switching circuit; and
   a control unit generating said control signal to control said switching circuit to connect said impedance matching circuit to a path from said second antenna to said transmitting and receiving circuit when said transmitting and receiving circuit carries out a receiving operation using said second antenna while said receiving circuit carries out a receiving operation using said first antenna.

2. The multiple portable phone according to claim 1, further comprising a common filter of a low pass filter and a band pass filter, and wherein said receiving circuit is connected to said second antenna via said switching circuit and said low pass filter in response to said control signal, and said transmitting and receiving circuit is connected to said second antenna via said band pass filter.

3. The multiple portable phone according to claim 1, wherein said control unit controls said receiving circuit while generating said control signal, such that said receiving circuit carries out an intermittent receiving operation in a first predetermined time interval as said receiving operation while one of said first and second antennas is selected.

4. The multiple portable phone according to claim 3, wherein said control unit controls said transmitting and receiving circuit while generating said control signal, such that said transmitting and receiving circuit carries out an intermittent receiving operation in a second predetermined time interval as said receiving operation using said second antenna.

5. The multiple portable phone according to claim 4, wherein said control unit controls said intermittent receiving operation of said receiving circuit and said intermittent receiving operation of said transmitting and receiving circuit to be independent and asynchronous.

6. The multiple portable phone according to claim 1, further comprising a transmitting circuit provided for said first communication system, and connectable to said first and second antennas via said switching circuit, and wherein said switching circuit comprises:
first and second switches operatively connectable said receiving circuit to said first antenna;
third and fourth switches operatively connectable said transmitting circuit to said first antenna via said first switch, wherein a node between said third and fourth switches is operatively connected to said second antenna; and
a fifth switch operatively connectable said impedance matching circuit to said second antenna via said first switch,
wherein said first to fifth switches are controlled in response to said control signal.

7. The multiple portable phone according to claim 6, wherein said switching circuit further comprises:
a sixth switch connected between a first external terminal and a node between said second switch and said receiving circuit, and
wherein said sixth switch is controlled in response to said control signal.

8. The multiple portable phone according to claim 6, wherein said switching circuit further comprises:
a seventh switch connected between a second external terminal and the node between said second switch and said receiving circuit; and
an eighth switch connected between a second external terminal and a node between said fourth switch and said transmitting circuit, and
wherein said sixth to eighth switches are controlled in response to said control signal.

9. The multiple portable phone according to claim 1, wherein said impedance matching circuit has substantially the same impedance as the receiving circuit.

10. The multiple portable phone according to claim 1, wherein said first communication system is a PDC system and said second communication system is a PHS system.

11. The multiple portable phone according to claim 1, wherein said first antenna is built in said phone.

12. An antenna switching method in a multiple portable phone, said method comprising:
(a) selectively connecting a receiving circuit for a first communication system to one of a first antenna and a second antenna via a switching circuit for a receiving operation of said receiving circuit;
(b) connecting a transmitting and receiving circuit for a second communication system to said second antenna for a receiving operation of said transmitting and receiving circuit; and
(c) compensating impedance change depending on said switching circuit, wherein said (c) step includes:
connecting said impedance matching circuit to said path from said second antenna to said transmitting and receiving circuit when said transmitting and receiving circuit carries out said receiving operation using said second antenna while said receiving circuit carries out said receiving operation using said first antenna.

13. The method according to claim 12, wherein said (a) step includes:
connecting said receiving circuit to said second antenna via said switching circuit and a low pass filter, and
said (b) step includes:
connecting said transmitting and receiving circuit to said second antenna via a band pass filter.

14. The method according to claim 12, wherein said receiving operation of said receiving circuit is an intermittent receiving operation in a first predetermined time interval while one of said first and second antennas is selected.

15. The method according to claim 14, wherein said receiving operation of said transmitting and receiving circuit is an intermittent receiving operation in a second predetermined time interval using said second antenna.

16. The method according to claim 15, wherein said intermittent receiving operation of said receiving circuit and said intermittent receiving operation of said transmitting and receiving circuit are independent from each other and asynchronous with each other.

17. The method according to claim 12, wherein said impedance matching circuit has substantially the same impedance as the receiving circuit.

18. The method according to claim 12, wherein said first communication system is a PDC system and said second communication system is a PHS system.

* * * * *